United States Patent [19]

Willibrordus et al.

[11] Patent Number: 5,514,932
[45] Date of Patent: May 7, 1996

[54] LOW-PRESSURE MERCURY VAPOR DISCHARGE LAMP WITH REFLECTIVE LAYER HAVING PRESCRIBED BIMODAL DISTRIBUTION OF LARGE AND SMALL PARTICLES

[75] Inventors: Pünt F. J. Willibrordus; Baaten P. M. Johannes, both of Roosendaal, Netherlands

[73] Assignee: U.S. Philips Corporation, New York, N.Y.

[21] Appl. No.: 293,635

[22] Filed: Aug. 18, 1994

[30]  Foreign Application Priority Data

Aug. 20, 1993 [BE] Belgium ............................... 09300850

[51] Int. Cl.⁶ ..................................................... H01J 61/35
[52] U.S. Cl. ............................ 313/489; 313/113; 313/488
[58] Field of Search .................................... 313/489, 488, 313/493, 572, 577, 113, 635

[56]  References Cited

U.S. PATENT DOCUMENTS

| | | | |
|---|---|---|---|
| 3,717,781 | 2/1973 | Sadoski et al. | 313/113 X |
| 3,842,306 | 10/1974 | Henderson et al. | 313/116 |
| 4,797,594 | 1/1989 | Sigai et al. | 313/488 |
| 4,924,141 | 5/1990 | Taubner et al. | 313/488 |
| 5,258,689 | 11/1993 | Jansma et al. | 313/489 |

FOREIGN PATENT DOCUMENTS

WO8810005 12/1988 WIPO ................................. 313/488

OTHER PUBLICATIONS

Hiemenz, "Principles of Colloid and Surface Chemistry", Chapters 8.6–8.9, pp. 322–335, 1977.

Primary Examiner—Sandra L. O'Shea
Assistant Examiner—Ashok Patel
Attorney, Agent, or Firm—Brian J. Wieghaus

[57]  ABSTRACT

A low-pressure mercury vapor discharge lamp having a discharge vessel which is sealed in a gastight manner and encloses a discharge space which contains a filling of mercury and rare gas and in which an electric discharge is maintained. A portion of a surface of the discharge vessel facing the discharge space has a reflector layer of aluminum oxide particles which includes a comparatively great porportional weight of larger particles with a median diameter of 0.25 to 0.80 μm and a comparatively small proportional weight of smaller aluminum oxide particles with a median diameter of 0.01 to 0.02 μm, which smaller particles are present dispersed among the larger particles. The product of the median of the overall particle size distribution and the specific surface of all particles taken together is at least $4\times10^{-3}$ m³/kg. As a result, the lamp has a comparatively high luminous efficacy.

21 Claims, 1 Drawing Sheet

LOW-PRESSURE MERCURY VAPOR DISCHARGE LAMP WITH REFLECTIVE LAYER HAVING PRESCRIBED BIMODAL DISTRIBUTION OF LARGE AND SMALL PARTICLES

BACKGROUND OF THE INVENTION

The invention relates to a low-pressure mercury vapour discharge lamp comprising a discharge vessel which is sealed in a gastight manner and encloses a discharge space which contains a filling of mercury and a rare gas, which discharge lamp furthermore comprises means for maintaining an electric discharge in the discharge space, while a portion of the surface of the discharge vessel facing the discharge space has a reflector layer of aluminium oxide particles.

Such a lamp, which can be used for reprographic purposes, is known from EP 0,270,866. The known lamp has a tubular discharge vessel. A first and a second electrode arranged therein in mutual opposition, form means for maintaining an electric discharge in the discharge space. The discharge vessel has on an internal surface, a reflector layer which extends over the full length of the discharge vessel. The reflector layer leaves a portion of the circumference exposed so that a window is formed through which radiation can leave the discharge space. The reflector layer counteracts loss and undesirable dispersion of radiation and increases the intensity of radiation leaving the discharge space through the window. The reflector layer of the known lamp comprises aluminium oxide particles with an average size of 0.5–1.0 μm.

Nevertheless, much radiation is lost in the known lamp owing to the fact that it is not reflected by the reflector layer. This is detrimental to the luminous efficacy of the lamp.

SUMMARY OF THE INVENTION

It is an object of the invention to provide a measure in a lamp of the kind described in the opening paragraph which facilitates in a simple manner an improvement in the reflectivity of the reflector layer and thus an increased efficacy of the lamp.

According to the invention, the low-pressure mercury vapour discharge lamp is for this purpose characterized in that the aluminium oxide particles comprise, besides a comparatively great proportional weight of larger particles of which the median diameter measured with a SHIMADZU particle size gauge is 0.25 to 0.80 μm, also a comparatively small proportional weight of smaller aluminium oxide particles with a median diameter of 0.01 to 0.02 μm, which smaller particles are present dispersed among the larger particles, while the product of the median of the overall particle size distribution and the specific surface of all particles together is at least $4 \times 10^{-3}$ m$^3$/kg. The smaller particles are, for example, ALON-C particles. These have a median diameter of 0.013 μm. Smaller aluminium oxide particles may form clusters with a size of 0.10 to 0.15 μm in that case. Powders of both larger particles and smaller particles of aluminium oxide are commercially available.

The invention is based on the recognition that a portion of the radiation is not reflected at the surface of the larger particles in a reflector layer which comprises exclusively larger particles, but enters spaces between the larger particles and is absorbed therein during multiple reflections by the larger particles. Since the smaller particles have dimensions which are substantially smaller than the wavelength(s) of the radiation generated in the lamp, a layer comprising exclusively particles of this type reflects less well than a layer comprising exclusively larger particles. The larger particles have dimensions of the same order of magnitude as the wavelength(s) of the radiation. In a reflector layer in which a comparatively small weight percentage of smaller particles is distributed among the larger particles, however, the spaces between the larger particles are at least partly fried up with smaller particles. Radiation which would disappear in the spaces between the larger particles in the absence of the smaller particles is now reflected directly by the smaller particles in the direction of the discharge space. The reflector layer which comprises not only larger particles but also smaller particles, accordingly, has a higher reflectivity than a reflector layer comprising larger particles only.

The reflector layer on the one hand has a comparatively large specific surface as a result of the presence of the smaller particles. On the other hand, the median of the particle size distribution is comparatively great because the reflector layer comprises a comparatively great proportional weight of larger particles. The product of the median and the specific area is therefore comparatively great compared with that of a reflector layer comprising exclusively larger or smaller particles. The inventors have obtained favourable results with compositions of which the said product was at least $4.0 \times 10^{-3}$ m$^3$/kg.

An attractive embodiment of the low-pressure mercury vapour discharge lamp according to the invention is characterized in that the proportion of the smaller particles in the reflector layer lies between 4 and 40% by weight.

If the proportional weight of the smaller particles is below 4%, the spaces between the larger particles still contain comparatively few smaller particles, so that still a major proportion of the radiation is lost in these spaces. If the reflector layer comprises a proportional weight of smaller particles above 40%, the smaller particles also occupy spaces where larger particles could otherwise have been accommodated. Radiation which would otherwise have hit a larger particle will then hit a multitude of smaller particles and have a smaller chance of being reflected towards the discharge space. The reflectivity of the reflector layer is smaller than the reflectivity which would be achieved with a comparatively small proportional weight of smaller particles.

The reflector layer may be provided, for example, by electrostatic coating.

If the reflector layer is obtained from a suspension in an organic medium, it is favourable when the proportional weight of the smaller particles is below approximately 15%. It is found that the suspension can then be easily kept for a longer period. A suspension in water also renders possible longer storage times in the case of a higher proportional weight of smaller particles.

Very favourable results were achieved with a reflector layer which is characterized in that the median diameter of the larger particles lies between 0.4 and 0.6 μm.

An advantageous embodiment of the low-pressure mercury vapour discharge lamp according to the invention is characterized in that the coating weight of the reflector layer is below 5 mg/cm$^2$. A reflector layer with a coating weight below this value can be readily provided on the discharge vessel by spraying. A comparatively high viscosity of the suspension is required for a greater coating weight. This involves a risk of the suspension provided on the surface falling to flow out evenly over the surface. Alternatively, for example, the reflector may be provided in that a suspension is caused to flow over the surface and the discharge vessel is subsequently tipped over several times until the reflector layer has spread over the desired surface area. A greater coating weight may be readily realised in this manner.

BRIEF DESCRIPTION OF THE DRAWINGS

Embodiments of the low-pressure mercury vapour discharge lamp according to the invention are explained in more detail with reference to the drawings, in which.

DESCRIPTION OF THE PREFERRED EMBODIMENTS

Figure 1:
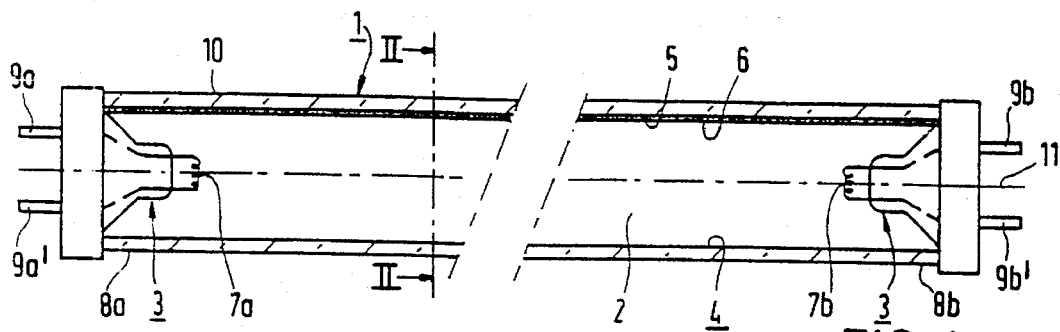
FIG. 1 shows a first embodiment.

The low-pressure mercury vapour discharge lamp shown in FIG. 1 comprises a tubular discharge vessel 1 which is sealed in a gaslight manner and encloses a discharge space 2 which contains a filling of mercury and a rare gas. The discharge lamp further comprises means 3 for maintaining an electric discharge in the discharge space 2. Said means 3 are formed by a first and a second electrode 7a, 7b which are arranged at respective ends 8a, 8b of the discharge vessel. The electrodes 7a, 7b are connected to contact pins 9a, 9a' and 9b, 9b'. A portion 5 of a surface 4 of the discharge vessel 1 facing the discharge space 2 has a reflector layer 6 of aluminium oxide particles (see also FIG. 2). The aluminium oxide particles comprise a comparatively great proportional weight, i.e. 95%, of larger aluminium oxide particles with a median diameter of 0.25 to 0.80 µm, and a comparatively small proportional weight, i.e. 5%, of smaller aluminium oxide particles with a median diameter of 0.01 to 0.02 µm.

The larger particles are obtained from Baikowsky CR6 aluminium oxide powder. A median diameter of 0.47 µm was measured with a SHIMADZU SA-CP3 particle size gauge. For this purpose, a suspension containing 10% CR6 by weight was charge-stabilized in an acetic acid solution of $10^{-2}$ molarity in that it was vibrated ultrasonically for five minutes in a Branson 1200 type ultrasonic cleaner. According to manufacturer's data based on a BET measurement, the specific area of CR6 is approximately 6 m²/g. The principle of the BET measurement, which was pioneered by S. Brunauer, P. H. Emmett and E. Teller, is described in chapters 8.6–8.9 of Principles of Colloid and Surface Chemistry by P. C. Hiemenz, first impression.

The smaller particles are derived from ALON-C manufactured by Degussa. According to data supplied by the manufacturer, the median diameter is approximately 0.013 µm and the specific surface approximately 100 m²/g (again on the basis of a BET measurement). In a practical realisation of the embodiment of FIGS. 1 and 2, the reflector layer 6 leaves exposed a window 10 with an angle of aperture φ of 160° relative to the centreline 11 of the discharge vessel. The reflector layer 6 has a coating weight of 3.3 mg/cm². So the coating weight is below 5 mg/cm².

The reflector layer 6 was obtained from a suspension in an organic medium which contains, besides the aluminium oxide powders of the CR6 and ALON-C types in a ratio of 95:5 by weight, also the suspension agents butyl acetate and ethyl lactate, and nitrocellulose as a binder. Clusters with a diameter of approximately 0.10 to approximately 0.15 µm were present in the suspension, composed of the ALON-C particles in the suspension. The suspension was provided on the surface in that it was caused to flow over this surface. The discharge vessel was pivoted about its longitudinal axis during this so as to spread the suspension. Alternatively, for example, the suspension may be sprayed on the surface.

In the above embodiment, the proportional weight of the smaller particles lies between 4 and 40%. In particular, the proportional weight is below 15%. A suspension in an organic medium in which the proportional weight of the smaller particles is below 15% remains stable during a comparatively long period. The suspension may alternatively be prepared in water and comprise, for example, polycarboxylic acid of the DISPEX brand as a stabilizer, polyethylene oxide of the POLYOX brand as a binder, and nonylphenoxy polyethanol of the ANTAROX brand as a flow-promoting agent. Such a suspension remains stable for a comparatively long period also when it contains a greater proportional weight, for example 45%, of smaller particles.

The median diameter of the larger particles in the reflector layer is 0.47 µm, i.e. it lies between 0.40 and 0.60 µm.

The median of the overall particle size distribution of the larger and smaller particles together is 0.45 µm. The product of this with the specific surface, which is 10.7 m²/g, for all particles together is above $4 \times 10^{-3}$ m³/kg. This product here is $4.82 \times 10^{-3}$ m³/kg.

The radiation with wavelengths of 185 nm and 254 nm which leaves the window of the lamp shown has an intensity which is approximately 4% higher than that of a lamp of which the reflector layer comprises exclusively CR6.

Figure 2:
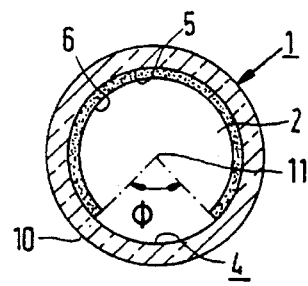
FIG. 2 is a cross-section taken on the line II—II in FIG. 1.

The lamp of FIGS. 1 and 2 is very suitable, for example, for a device in which the radiation generated by the lamp is used for disinfection purposes.

In an alternative embodiment, the lamp is provided with a luminescent layer which covers the reflector layer. The luminescent layer leaves, for example, the window exposed. In this embodiment the window has an angle of aperture, for example, of 20° to 90°. Such a lamp may be used for reprographic purposes. Alternatively, the luminescent layer may extend over the full circumferenCe so that it also covers the window. Such lamps having a luminescent layer of barium silicate activated by lead (BSP) are used, for example, as suntanning lamps. Alternatively, for example, the luminescent layer may comprise the luminescent materials barium-magnesium aluminate activated by bivalent europium (BAM), cerium-terbium-magnesium aluminate activated by trivalent terbium (CAT), and yttrium oxide activated by trivalent europium (YOX). The lamp is suitable then for general lighting purposes.

Figure 3:
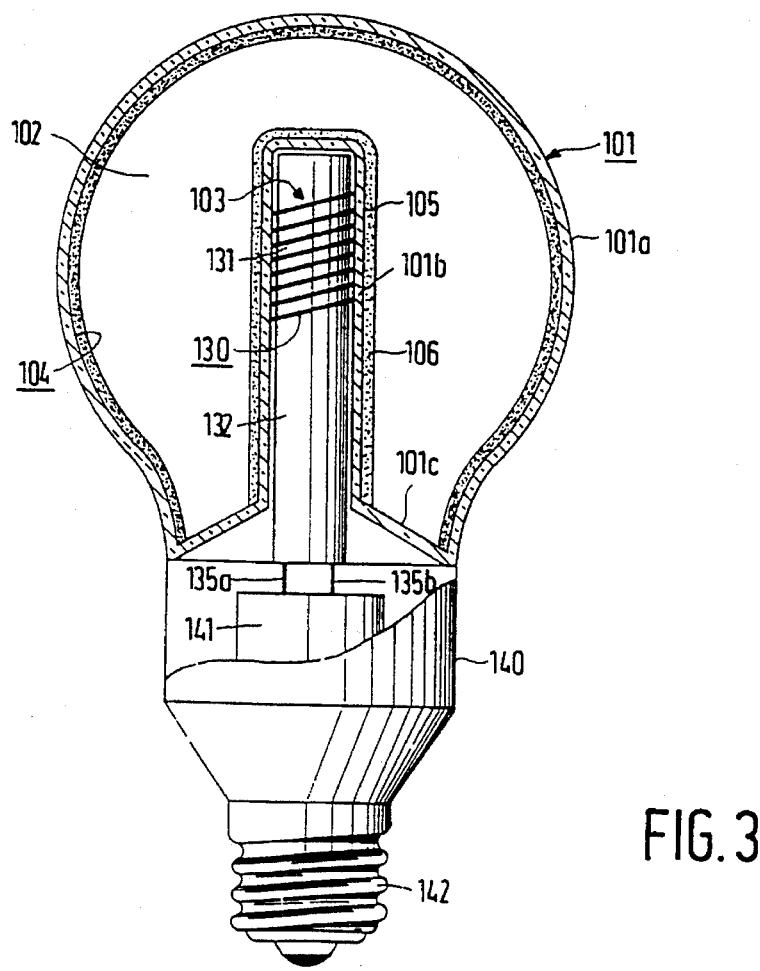
FIG. 3 shows a second embodiment.

In FIG. 3, components corresponding to those of FIG. 1 and/or 2 have reference numerals which are 100 higher. The embodiment of the lamp according to the invention shown in this Figure comprises a light-transmitting discharge vessel 101 with a pear-shaped enveloping portion 101a of lime glass and a tubular concave portion 101b of lead glass which is connected to the enveloping portion 101a via a flare 101c. The discharge vessel 101 encloses a discharge space 102 which contains a filling of mercury and a rare gas. A portion 105 of a surface 104 of the discharge vessel 101 facing the discharge space 102 carries a reflector layer 106. The reflector layer 106, which has a coating weight of approximately 2.5 mg/cm², was obtained in that the concave portion 101b was dipped in a suspension containing aluminium powder of the CR6 type and ALON-C in a weight ratio of 9:1. The proportional weight of the smaller particles in the reflector layer lies between 4 and 40%. In particular, the proportional weight of the smaller particles is below 15%.

The median diameter of the larger particles lies between 0.4 and 0.6 μm. In this case the median diameter is 0.47 μm. The median of the overall particle size distribution of the particles together is 0.43 μm. The specific surface of the larger particles and the smaller particles taken together is 15.4 m²/g. The product of the median diameter and the specific surface therefore is $6.6 \times 10^{-3}$ m³/kg and is thus greater than $4 \times 10^{-3}$ m³/kg.

In a modification of the embodiment shown, the reflector layer extends up to the flare 101c. Alternatively, the reflector layer may cover a portion of the enveloping portion 101a of the discharge vessel 101, for example, for forming a bowl mirror lamp.

Means 103 for maintaining an electric discharge in the discharge space 102 are formed by a coil 130 which is accommodated in the concave portion 101b of the discharge vessel 101 of the lamp. The coil 130 is provided with a winding 131 of an electrically conducting wire around a coil former 132 made of synthetic resin in which a core (not shown in the Figure) of soft-magnetic material is accommodated. Alternatively, the coil 130 may have, for example, an air core. The discharge vessel 101 is fastened to a housing 140 in which a supply unit 141 is fastened and which carries an Edison lamp cap 142. Input terminals of the supply unit 141 are connected to contacts of the lamp cap 142. Current supply conductors 135a, 135b connect the winding 131 of the coil 130 to output terminals of the supply unit 141.

To investigate the influence of particle size on the reflectivity of the reflector layer, three lamps (C) conforming to the embodiment of the invention shown in FIGS. 1 and 2 were manufactured in which the larger particles were derived from aluminium oxide powder of the CR6 type and five lamps (E) in which the larger particles were derived from aluminium oxide powder of the SM8 type. The latter powder type has a particle size distribution with a median of 0.33 μm and a specific surface of approximately 10 m²/g.

The reflector layers in the above lamps (C, E) comprise besides CR6 of SM8 also ALON-C. The weight ratio in which these components are present in the reflector layer is 87:13.

Furthermore, five reference lamps (B) were manufactured in which the reflector layer comprises exclusively aluminium oxide particles derived from aluminium oxide powder of the CR6 type. In five further reference lamps (D), the aluminium oxide particles were derived exclusively from aluminium oxide powder of the SM8 type. In addition, four more reference lamps (A) were manufactured with a reflector layer comprising exclusively ALON-C particles.

The reflector layer in each of the lamps A to E leaves a window exposed with an angle of aperture of 110° relative to the centreline of the discharge vessel. The lamps have no luminescent layer.

The Table below lists the relative values of the radiant intensity (δI in %) of the above lamps (A to E) compared with lamps having no reflector layer. Also given are the coating weight (G), the percentage of smaller particles (P_), the percentage of larger particles (P+), the median (d₅₀) of the overall particle size distribution of all particles together, and the product (v in $10^{-3}$ m³/kg) of the median diameter and the specific surface.

| Lamp | Composition | G (mg/cm²) | P_ (%) | P+ (%) | d₅₀ (μm) | v ($10^{-3}$ m³/kg) | δI (%) |
|---|---|---|---|---|---|---|---|
| A | Alon-C | 0.34 | 100.0 | <1 | 0.013 | 1.3 | 7 |
| B | CR6 | 2.6 | <1 | 100.0 | 0.47 | 2.82 | 83 |
| C | CR6+Alon-C | 2.7 | 13.0 | 87.0 | 0.42 | 7.64 | 90 |
| D | SM8 | 2.5 | <1 | 100.0 | 0.33 | 3.30 | 77 |
| E | SM8+Alon-C | 2.5 | 13.0 | 87.0 | 0.31 | 6.73 | 86 |

The radiant intensity of the lamp (A) provided with a reflector layer of exclusively ALON-C is only slightly (7%) higher than that of a lamp having no reflector layer. The radiant intensities of lamps (B, D) provided with a reflector layer comprising exclusively CR6 or SM8 are greater by 83 and 77%, respectively, than that of a lamp without reflector layer. A reflector layer of the latter type, which comprises substantially only larger particles, is thus much more suitable than a reflector layer comprising substantially only smaller particles. Nevertheless, an increase in the relative radiant intensity is achieved in lamps of which the reflector layer comprises not only a comparatively great proportional weight of larger particles but also a comparatively small proportional weight of smaller particles. An addition of ALON-C to larger particles derived from SM8 (Lamp E) causes a comparatively strong increase in the radiant intensity compared with that obtained through the addition of ALON-C to CR6 (Lamp C). The resulting radiant intensity, however, is highest in lamps provided with a reflector layer composed from CR6 and ALON-C (Lamp C).

It was observed that an addition of ALON-C also has a favourable influence on the relative radiant intensity when the larger particles are derived from Baikowsky CR1 aluminium oxide powder. The relative radiant intensity, however, is smaller than that of a reflector layer which contains instead of CR1 an equal proportional weight of CR6. The median diameter of the CR1 particles is approximately 0.69 μm. Their specific surface is approximately 3 m²/g.

To ascertain the influence of the proportional weight of the smaller particles on the relative radiant intensity, nine lamps were manufactured provided with a reflector layer containing exclusively CR6, nine lamps with the aluminium oxide powders CR6 and ALON-C in a weight ratio of 95:5, nine lamps with a weight ratio of 90:10, and nine lamps with a weight ratio of 85:15. The reflector layers of the said 36 lamps have a coating weight of approximately 3.3 mg/cm² and each leave a window exposed with an angle of aperture of 160° relative to the centreline of the discharge vessel. Furthermore, the lamps have a luminescent layer of barium silicate activated by lead (BSP) which covers the reflector layer and the window and which has a coating weight of 3.1 mg/cm². The average radiant intensity was measured for each group of nine lamps. It was found for the weight ratios given above that the average value increases approximately proportionally with the proportional weight of smaller particles in the reflector layer. More in particular, it was found that the average value of the radiant intensity of lamps whose aluminium oxide powder in the reflector layer contained G_% by weight of Alon-C is approximately 0.3 G_% higher than that of lamps whose reflector layer contains no Alon-C.

The lumen output of the embodiment of the lamp according to the invention shown in FIG. 3 was compared with that of a lamp not according to the invention, a reflector layer with a coating weight of approximately 2.5 mg/cm² being provided on the concave portion of the discharge vessel through immersion in a suspension which contains exclusively aluminium oxide powder of the CR6 type. The luminous efficacy of the lamp not according to the invention is 70.0 lm/w. The lamp according to the invention has a 4% higher luminous efficacy of 72.8 lm/w.

We claim:

1. A low-pressure mercury vapour discharge lamp comprising a discharge vessel sealed in a gastight manner and enclosing a discharge space, a filling of mercury and a rare gas within the discharge space, and means for maintaining an electric discharge in the discharge space, a portion of the surface of the discharge vessel facing the discharge space having a reflector layer of aluminium oxide particles, characterized in that:

the aluminium oxide particles comprise a comparatively great proportional weight of larger particles with a median diameter of 0.25 to 0.80 µm and a comparatively small proportional weight of smaller aluminium oxide particles with a median diameter of 0.01 to 0.02 µm, which smaller particles are present dispersed among the larger particles, while the mathematical product of the median of the overall particle size distribution and the specific surface of all particles together is at least $4 \times 10^{-3}$ m³/kg.

2. A low-pressure mercury vapour discharge lamp as claimed in claim 1, characterized in that the proportion of the smaller particles in the reflector layer lies between 4 and 40% by weight.

3. A low-pressure mercury vapour discharge lamp as claimed in claim 2, characterized in that the proportional weight of the smaller particles in the reflector layer is below approximately 15%.

4. A low-pressure mercury vapour discharge lamp as claimed in claim 3, characterized in that the median diameter of the larger particles lies between 0.4 and 0.6 µm.

5. A low-pressure mercury vapour discharge lamp as claimed in claim 4, characterized in that the coating weight of the reflector layer is below 5 mg/cm².

6. A low-pressure mercury vapour discharge lamp as claimed in claim 3, characterized in that the coating weight of the reflector layer is below 5 mg/cm².

7. A low-pressure mercury vapour discharge lamp as claimed in claim 2, characterized in that the coating weight of the reflector layer is below 5 mg/cm².

8. A low-pressure mercury vapour discharge lamp as claimed in claim 1, characterized in that the coating weight of the reflector layer is below 5 mg/cm².

9. A low-pressure mercury vapour discharge lamp as claimed in claim 2, characterized in that the median diameter of the larger particles lies between 0.4 and 0.6 µm.

10. A low-pressure mercury vapour discharge lamp as claimed in claim 9, characterized in that the coating weight of the reflector layer is below 5 mg/cm².

11. A low-pressure mercury vapour discharge lamp as claimed in claim 1, characterized in that the median diameter of the larger particles lies between 0.4 and 0.6 µm.

12. A low-pressure mercury vapour discharge lamp as claimed in claim 11, characterized in that the coating weight of the reflector layer is below 5 mg/cm².

13. A low pressure mercury vapor aperture lamp, comprising:

a) a light-transmissive discharge vessel sealed in a gas-tight manner, having an inner surface and enclosing a discharge space;

b) a filling of mercury and a rare gas in the discharge space;

c) means for maintaining an electric discharge within said discharge space;

d) a reflective layer comprising aluminum oxide particles on said inner surface, said reflective layer being present on said inner surface over a major part of said inner surface and defining a light-transmissive aperture at areas where said reflective layer is not present, through which aperture light generated by said lamp is emitted, said aluminum oxide particles comprising a comparatively great proportional weight of larger particles with a median diameter of 0.25 to 0.80 µm and a comparatively small proportional weight of smaller aluminum oxide particles with a median diameter of 0.01 to 0.02 µm, which smaller particles are present dispersed among the larger particles, and the mathematical product of the median of the overall particle size distribution and the specific surface of small particles together is at least $4 \times 10^{-3}$ m³/kg; and e) a luminescent layer which covers said reflective layer.

14. A lamp according to claim 13, wherein said lamp vessel is tubular and defines a longitudinal axis, and said aperture has an angle of aperture measured from said longitudinal axis of between about 20 and about 90 degrees.

15. A lamp according to claim 13, wherein said luminescent layer covers said aperture.

16. A lamp according to claim 15, wherein said luminescent layer comprises barium silicate activated by lead.

17. A lamp according to claim 15, wherein said luminescent layer comprises barium-magnesium aluminate activated by lead, cerium-terbium-magnesium aluminate activated by trivalent terbium, and yttrium oxide activated by trivalent europium.

18. A lamp according to claim 13, wherein said luminescent layer comprises barium silicate activated by lead.

19. A lamp according to claim 13, wherein said luminescent layer comprises barium-magnesium aluminate activated by lead, cerium-terbium-magnesium aluminate activated by trivalent terbium, and yttrium oxide activated by trivalent europium.

20. A low pressure mercury vapor discharge lamp, comprising:

a. a light-transmissive discharge vessel sealed in a gastight manner, having an inner surface and enclosing a discharge space;

b. a filling of mercury and a rare gas in the discharge space;

c. means for maintaining an electric discharge within said discharge space; and d. a reflective layer on a portion of said inner surface of said discharge vessel for reflecting radiation produced by said electric discharge, said reflective layer comprising radiation reflective particles having a comparatively great proportional weight of larger particles with a median diameter of 0.25 to 0.80 µm and a comparatively small proportional weight of smaller particles with a median diameter of 0.01 to 0.02 µm, which smaller particles are present dispersed among the larger particles, and the mathematical product of the median of the overall particle size distribution and the specific surface of small particles together is at least $4 \times 10^{-3}$ m³/kg.

21. A low-pressure mercury vapour discharge lamp as claimed in claim 20, characterized in that the proportion of the smaller particles in the reflector layer lies between 4 and 40% by weight.

* * * * *